US006805270B1

(12) United States Patent
Fraser

(10) Patent No.: US 6,805,270 B1
(45) Date of Patent: Oct. 19, 2004

(54) FISHERMAN'S UTILITY ROD HOLSTER

(76) Inventor: Donald A. Fraser, 5200 Summit Ridge Dr., Apartment 5211, Reno, NV (US) 89523

(*) Notice: Subject to any disclaimer, the term of this patent is extended or adjusted under 35 U.S.C. 154(b) by 0 days.

(21) Appl. No.: 10/801,580

(22) Filed: Mar. 17, 2004

Related U.S. Application Data

(60) Provisional application No. 60/512,596, filed on Oct. 17, 2003.

(51) Int. Cl.[7] .................................................. A45C 1/04
(52) U.S. Cl. ....................... 224/673; 224/677; 224/684; 224/268; 224/922; D3/221
(58) Field of Search ................................ 224/673, 677, 224/680, 684, 251, 268, 922; D3/221, 224

(56) References Cited

U.S. PATENT DOCUMENTS

| | | | | |
|---|---|---|---|---|
| 2,003,893 A | | 6/1935 | Pan | |
| 2,735,596 A | * | 2/1956 | Smedley et al. | ............. 224/242 |
| 2,954,909 A | * | 10/1960 | Miller et al. | ................ 224/200 |
| 3,874,573 A | * | 4/1975 | Fruscella et al. | ........... 224/242 |
| 4,569,466 A | | 2/1986 | Webber | |
| 5,386,932 A | * | 2/1995 | Gross | ......................... 224/200 |
| 5,511,336 A | * | 4/1996 | Bishop | ......................... 43/21.2 |
| 5,533,657 A | * | 7/1996 | Rosen et al. | ................. 224/673 |
| 5,992,717 A | * | 11/1999 | Clewes et al. | .............. 224/251 |
| 6,129,251 A | * | 10/2000 | Lajoie | ......................... 224/197 |
| 6,237,821 B1 | * | 5/2001 | Owen | ......................... 224/200 |
| 6,267,276 B1 | * | 7/2001 | Cook | .......................... 224/183 |
| 6,357,639 B1 | * | 3/2002 | Williams | ..................... 224/222 |

* cited by examiner

Primary Examiner—Stephen K. Cronin
(74) Attorney, Agent, or Firm—Richard C. Litman

(57) ABSTRACT

The fisherman's utility rod holster which includes a first flat sheet of sturdy material and a second flat sheet of sturdy material shaped into a pair of pockets for receiving a measuring tape and a measuring scale. The pockets are attached to an upper center portion of the base. A D-ring is secured to a lower left portion of the base by a tab that is folded and secured to a back face of the base. An elongated channel having a plurality of vertically aligned slots is formed along the right side portion of the base. A rod support hook formed with a wide U-shaped portion for receiving a fishing rod handle and a narrow inverted U-shaped retaining portion that is removably secured within one of the vertically aligned slots. Elongated slots are formed in the top portion of the base above the compartments for receiving a belt.

14 Claims, 4 Drawing Sheets

FISHERMAN'S UTILITY ROD HOLSTER

CROSS-REFERENCE TO RELATED APPLICATION

This application claims the benefit of U.S. Provisional Patent Application Ser. No. 60/512,596, filed Oct. 17, 2003.

BACKGROUND OF THE INVENTION

1. Field of the Invention

The present invention relates to fishing rod holsters and more particularly to a holster for holding a fishing rod at a selected angle relative to the belt of a fisherman, and for storing fishing accessories in a manner for convenient access by the fisherman.

2. Description of the Related Art

Fishermen frequently encountered the problem of where to lay the rod when both hands need to be freed for other purposes. This problem can be extremely distracting especially when the fisherman is knee-deep in the water or along heavily overgrown banks. Another problem encountered by fishermen in this situation, particularly in locations where size and weight limitations are imposed upon a fisherman's catch, is the problem of having ready access to certain needed fishing accessories, such a measuring tape or weighing scale.

Many fishing rod holders and holsters have been presented in the prior art as solutions to these problems. For example, in U.S. Pat. No. 4,569,466 issued Feb. 11, 1986 to Webber a holster is taught that is provided in the form of a flat base formed of a flexible substance such as leather. The upper portion of the base includes slots through which a belt can be passed to secure the holster to a fisherman. A hole is provided for storing the holster when not in use upon hook. A closed rigid support loop is hinged to a lower portion of the base by an integral flap that encloses the inner part of the loop and is secured to the base by rivets. A substantially U-shaped rigid support is hinged at an opposite lower portion of the base in similar fashion. A slot is also provided on the lower portion of the base for accepting a thong. The thong is used to hold accessories such as line clippers. The U-shaped support is mounted nearer the belt line of the holster than the support loop so that the fishing rod extends outwardly and upwardly at an angle relative to the belt line. The angle is fixed between 20 degrees and 50 degrees.

In U.S. Pat. No. 5,386,932 issued Feb. 7, 1995 a self-tightening, belt-attachable fishing rod holder is taught. The holder includes an upper cloth or leather portion in the form of an integral loop for permitting a belt to pass therethrough. A relatively rigid leather or plastic lower portion is supported from the upper portion. A tensioning coil or strap is affixed to the lower portion. A sleeve having in open top portion and a closed bottom portion is provided formed of cloth or rubber. The top portion of the sleeve includes a perimeter sleeve encasing the loop. The bottom portion of the sleeve is fixed or removably attached to the lower portion. Tension imposed by the weight of a rod inserted into the sleeve causes the strap to tighten around the rod to automatically hold the rod securely in place. Accessories are attached to the holster by hook and loop fastening elements.

U.S. Pat. No. 2,003,893 issued Jun. 4, 1935 to L. K. La Pan teaches a fishing rod having a handgrip for holding fishing accessories. The handgrip comprising an elongated hollow bulbous-shaped member provided on its interior with opposed internal projections fashioned to provide supporting and retaining means. The projections divide the member into two spaced compartments. A measuring reel casing is supported in the retaining means. The measuring reel includes a measuring tape arranged for access and operation through a slot in one compartment of the bulbous-shaped member. The second compartment is fashioned to serve as a holder for a fish weighing scale and includes a removable covering plate.

None of the above inventions and patents, taken either singly or in combination, is seen to describe the instant invention as claimed. Thus a fisherman's utility rod holster solving the aforementioned problems is desired.

SUMMARY OF THE INVENTION

The fisherman's utility rod holster of the present invention comprises a base formed from a first flat generally square-shaped sheet of sturdy material with leather-like qualities. The lower left portion of the base includes a tab that is folded and secured to a back face of the base forming a vertical channel for rotatably attaching the straight portions of a rod holding D-ring. A plurality of spaced vertically aligned slots are formed in the base adjacent an elongated flap along the right portion of the base. The flap is folded and secured by fastening means to the back face of the base forming an elongated channel having the plurality of vertically aligned slots therein. The holster further includes a rod support hook that is adjustably positionable within the vertically aligned slots of the base. Elongated slots are formed in a top portion of the base above the compartments for receiving a belt.

A second flat sheet is provided that is shaped to form a pair of compartments. The compartments are attached to an upper center portion of the base below the elongated belt receiving slots by suitable fastening means. The first compartment contains an elongated weighing scale and the second compartment contains the casing of a tape measure. A pull-ring is connected to the weighing scale and the pull-tab of the measuring tape to allow a fisherman quick access with one finger to both accessories simultaneously.

Accordingly, it is a principal object of the invention to provide a safe, secure and convenient fishing rod holder for freeing the hands of a fisherman.

It is another object of the invention to provide a fishing rod holding device that is adjustable to several elevated positions.

It is a further object of the invention to provide a fishing rod holding device with compartments for storing a measuring tape and weighing scale that may be used simultaneously.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
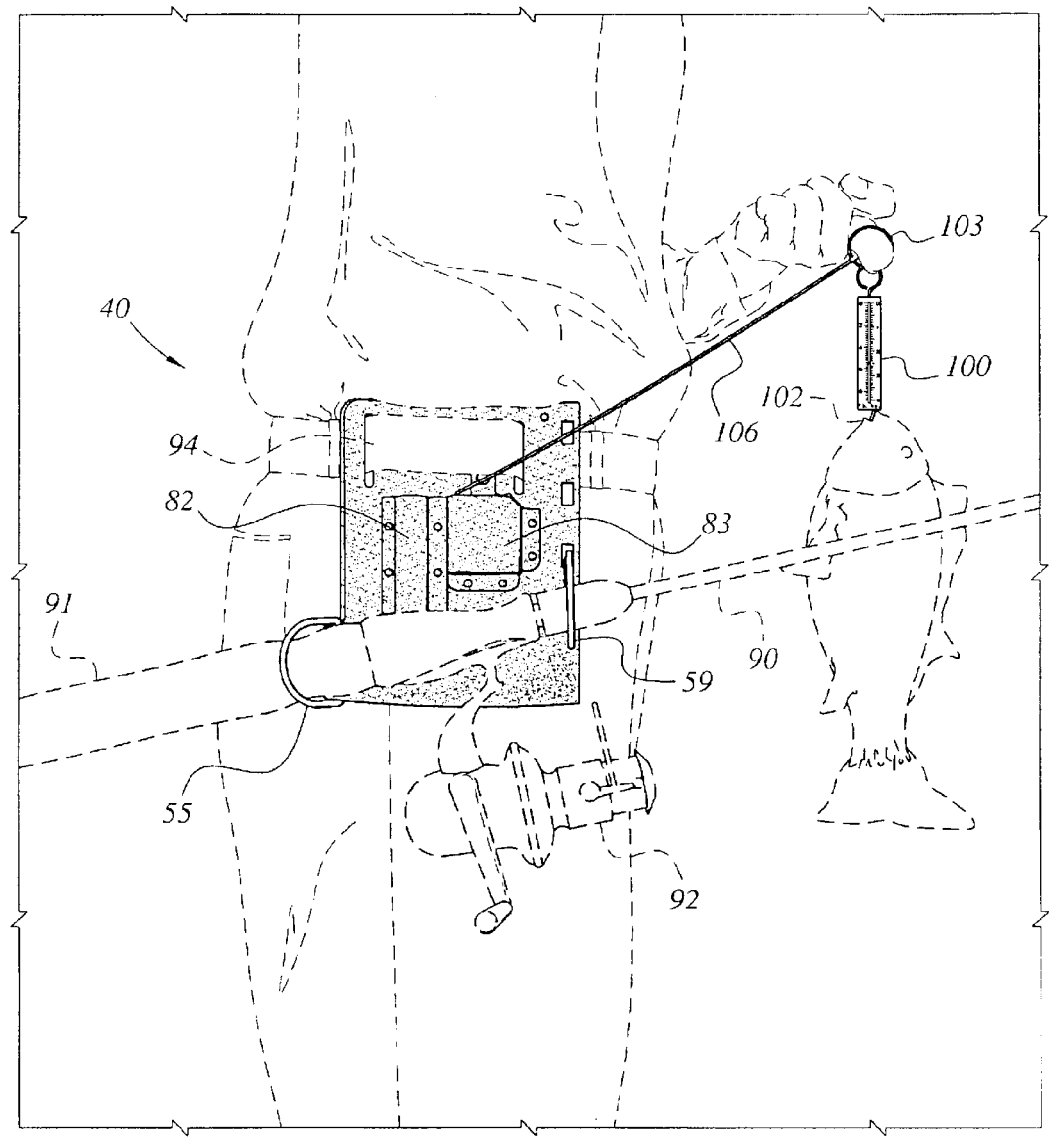
FIG. 1 is an environmental, perspective view of a fisherman's utility rod holster according to the present invention.

The present invention is a fisherman's utility rod holster 40 that is provided in the form of a flat base 41 formed from a first flat generally square-shaped sheet of sturdy material. Preferably, the first sheet is formed from finished cowhide leather but may be formed from plastic imitation leather such as Naugahide™, cloth materials such as heavy nylon or any other material having leather-like qualities.

The lower left portion of the base 41 includes an integrally formed tab 43 that is folded about a fold line 44 and secured to a back face of the base 41 forming a vertical channel 58 for holding the straight portions 56 and 57 of a metal handle holding D-ring 55. D-ring 55 is formed of 3/16-inch diameter steel wire. The right side portion of the base 41 includes an elongated flap 45. Spaced vertically aligned adjustment slots 51–54 are formed in base 41 adjacent the elongated. flap 45 on the right side portion of base 41. The flap 45 is folded about fold line 46 and secured by fastening means 81 to the back face of the base 41 forming an elongated ¼ inch diameter channel having the aligned of slots 51–54 therein. The slots are formed one-inch intervals from the top to the bottom of the base 41.

The holster 40 further includes a rod support hook 59 formed of 3/16-inch diameter steel wire having a wide U-shaped portion 60 for receiving a fishing rod handle 91 and a narrow inverted U-shaped retaining portion 61 that is removably positionable within the vertically aligned slots 51–54 of the base 41. Vertically oriented elongated slots 49, 50 are formed in the top portion of the base to facilitate attachment of the holster 40 to a fisherman's belt. Handle holding D-ring 55 and rod support hook 59 are pivotally mounted so as to lay flat for storage.

Figure 3:
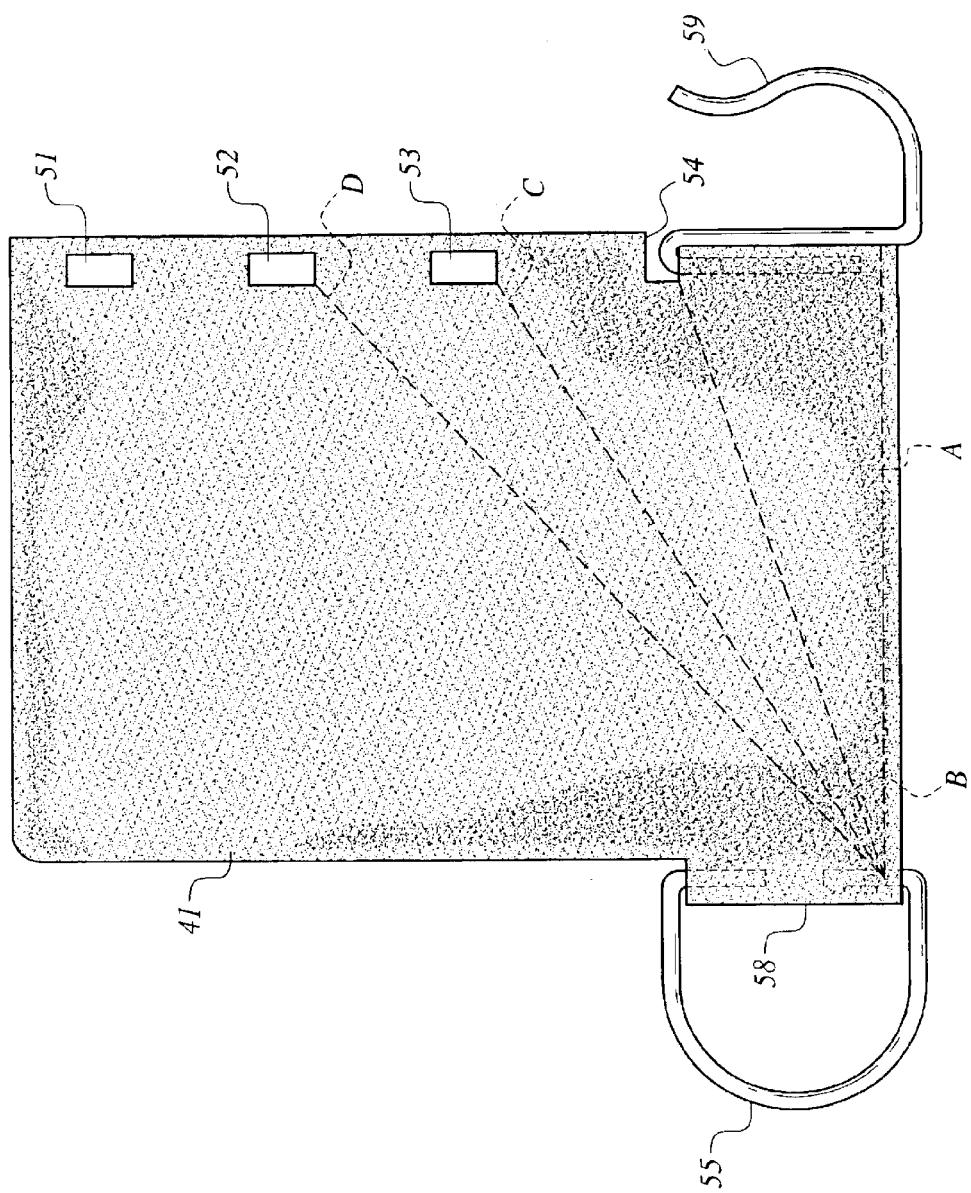
FIG. 3 is a plan view of the showing the various angles that a fishing rod can be supported using the adjustable support hook and adjustment slots according to the present invention.
Figure 4:
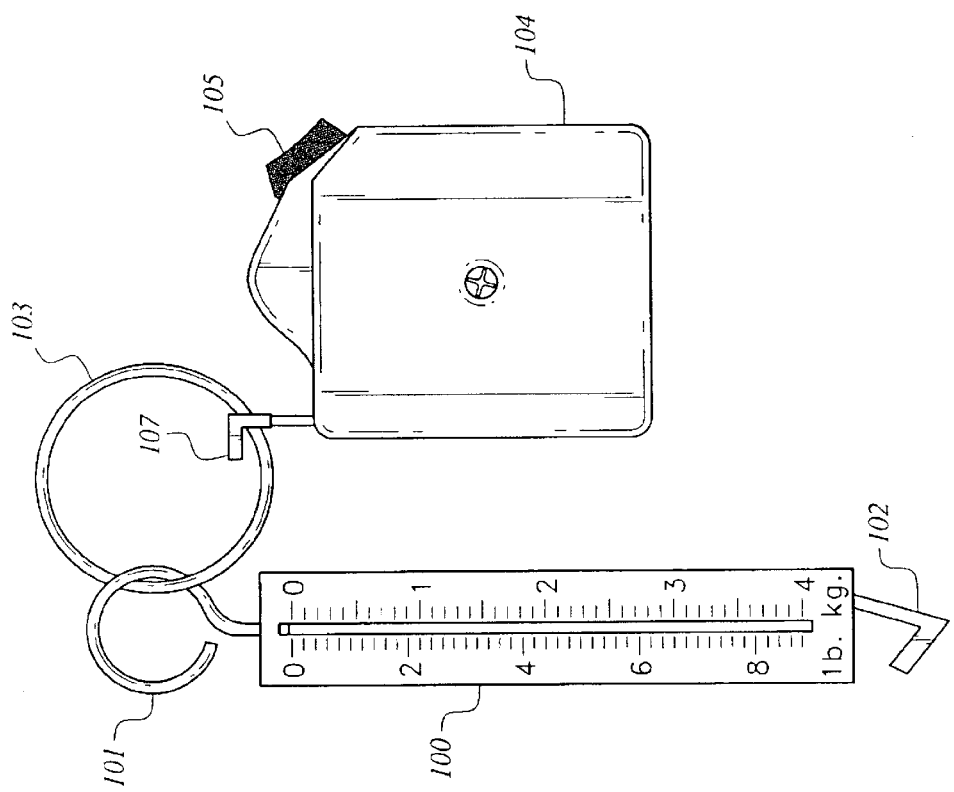
FIG. 4 is a front view of a weighing scale and tape measure connected for use with the holster according to the present invention.

Turning now to FIG. 3, it can be seen that adjustment slots 51–54 are positioned in the base 41 to change the angle at which fishing rod 90 is supported relative to the fisherman's belt. When rod support hook 59 is positioned within slot 54, fishing rod 90 is supported at an angle A of zero degrees. When rod support hook 59 is positioned within slot 53, fishing rod 90 is supported at an angle B of 15 degrees. When rod support hook 59 is positioned within slot 52, fishing rod 90 is supported at an angle C of 28 degrees. When hook 59 is positioned within slot 51, rod 90 is supported at an angle D of 42 degrees.

Figure 2:
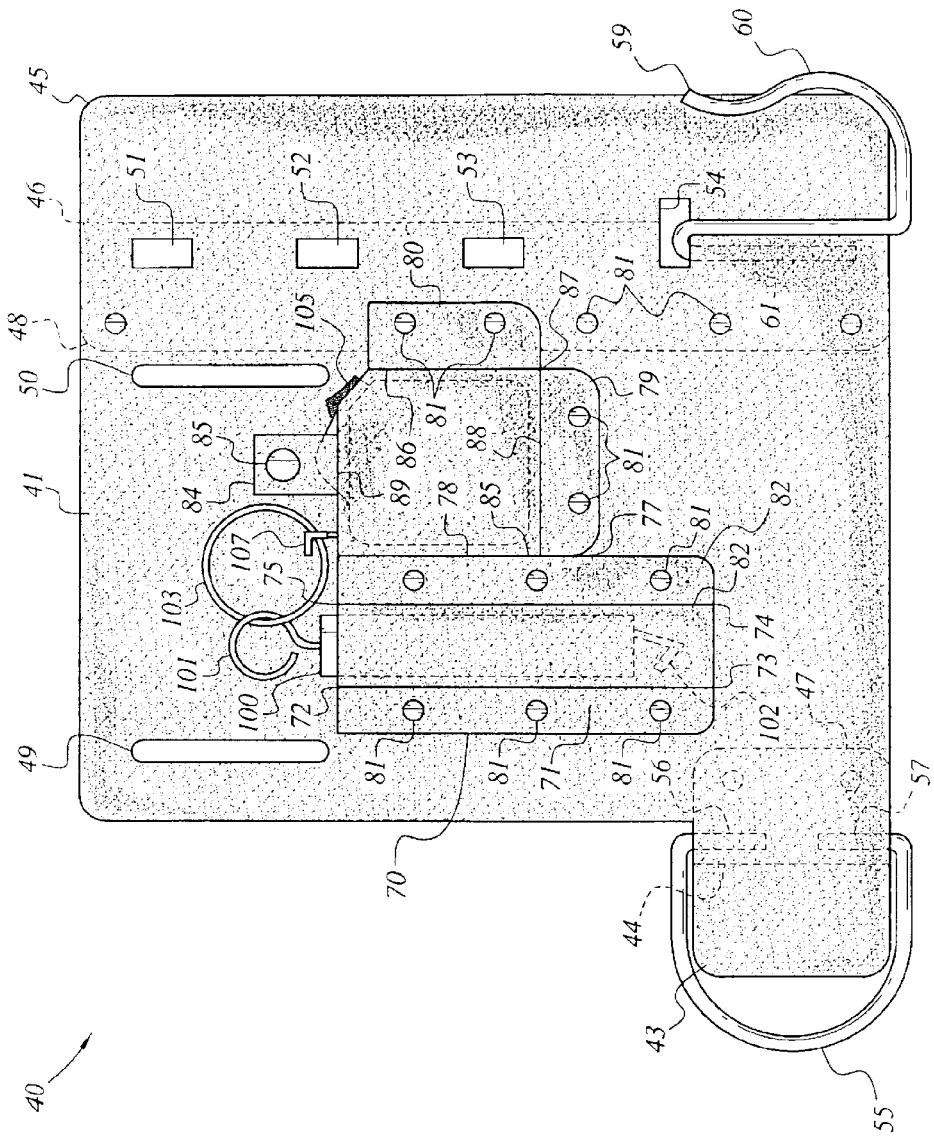
FIG. 2 is a front plan-view of a partially assembled holster according to the present invention.

A second flat sheet 70 of the same sturdy material is shown in FIG. 2. Sheet 70 is shaped to form a weighing scale receiving pocket 82 and a measuring tape receiving pocket 83. Sheet 70 is folded along fold lines 72–77, 86–89 to form attaching flaps 71, 76, 79 and 80 that are attached to an upper center portion of the base 41 by fastening means 81. Fastening means 81 is preferably in the form of rivets, however, fastening means 81 may be provided in the form of staples, sewing or any other suitable connecting arrangement. As best seen in FIGS. 1 and 2, the first pocket 82 is shaped to receive an elongated eight to fifteen pound weighing scale 100 having a weighing hook 102 and the second pocket 83 is shaped to receive the casing 104 of a three to six foot measuring tape 106 with tape hold/release button 105 exposed out the opening of pocket 83.

A narrow tab 84 is integrally formed on a top portion of the second sheet 70 and is provided with a releasable fastener element 85 to secure the tab 84 to the front face of base 41. The narrow tab 84 releasably secures a tape measure in the pocket 83 in a manner permitting the measuring tape 106 to be withdrawn from the casing 104 and permitting the tape hold/release button 105 of the tape measure to be easily accessible to the fisherman.

A one-inch in diameter grasping-ring 103 is connected to the holding ring 101 of the weighing scale 100 and the pull-tab 107 of the measuring tape 106. The pull-ring 103 allows a fisherman to quickly access the weighing scale 100 and measuring tape 106 for use when required.

When the holster 40 is formed from moldable plastic materials, prongs would be formed on the flaps 71, 76, 79 and 80 that cooperate with holes in base 41 in a snap-fit to secure sheet 70 to base 41. By reversing the arrangement of parts of holster 40 it can be adapted for a left-handed fisherman.

It is to be understood that the present invention is not limited to the embodiments described above, but encompasses any and all embodiments within the scope of the following claims.

I claim:

1. A fisherman's utility rod holster, comprising:
   a base formed from a first flat generally square-shaped sheet of sturdy material with leather-like qualities;
   said base including an integral tab on the lower left portion of the base that is folded and secured to a back face of the base forming a first vertical channel;
   a handle holding D-ring having straight portions received in said first vertical channel;
   an elongated flap formed along the right side portion of said base;
   a plurality of spaced vertically aligned adjustment slots formed in said base adjacent said elongated flap;
   said flap being folded and secured by fastening means to the back face of said base forming an elongated vertical channel having said plurality of adjustment slots therein;
   said holder including a rod support hook that is adjustably positionable within said adjustment slots of said base; and
   at least two elongated slots formed in a top portion of said base above said pockets for receiving a belt.

2. The fisherman's utility rod holster according to claim 1, wherein said first sheet is formed from one of finished cowhide leather, plastic imitation leather and cloth materials.

3. The fisherman's utility rod holster according to claim 2, wherein said handle holding D-ring and said rod support hook are formed of 3/16-inch diameter steel wire.

4. The fisherman's utility rod holster according to claim 1, wherein said fastening means is one of rivets, staples, and stitching.

5. A fisherman's utility rod holster, comprising:
   a base formed from a first flat generally square-shaped sheet of sturdy material with leather-like qualities;
   said base including an integral tab on the lower left portion of the base that is folded and secured to a back face of the base forming a first vertical channel;
   a handle holding D-ring having straight portions received in said first vertical channel;
   an elongated flap formed along the right side portion of said base;
   a plurality of spaced vertically aligned adjustment slots formed in said base adjacent said elongated flap;
   said flap being folded and secured by fastening means to the back face of said base forming an elongated vertical channel having said plurality of adjustment slots therein;

said holder including a rod support hook that is adjustably positionable within said adjustment slots of said base;

at least two elongated slots formed in a top portion of said base above said pockets for receiving a belt; and a second sheet formed from a sturdy material, said second sheet being folded and attached to said base by fastener means to form a first pocket and a second pocket for receiving fishing accessories.

6. The fisherman's utility rod holster according to claim 5, wherein said first and second sheets are formed from one of finished cowhide leather, plastic imitation leather and cloth materials.

7. The fisherman's utility rod holster according to claim 6, wherein said handle holding D-ring and said rod support hook are formed of 3/16-inch diameter steel wire.

8. The fisherman's utility rod holster according to claim 5, wherein said fastening means is one of rivets, staples, and stitching.

9. The fisherman's utility rod holster according to claim 5, further comprising:

a tape measure received within said second pocket such that a pull tab on the measuring tape is exposed outside said second pocket.

10. The fisherman's utility rod holster according to claim 9, further comprising:

a weighing scale received within said first pocket, said weighing scale having a hook and a holding ring; and a grasping ring connected to said holding ring and said pull tab.

11. The fisherman's utility rod holster according to claim 10, wherein said weighing scale is an eight to fifteen pound weighing scale.

12. The fisherman's utility rod holster according to claim 11, wherein said measuring tape is 3–6 feet.

13. The fisherman's utility rod holster according to claim 12, wherein a tape hold/release button of said measuring tape is exposed above said second pocket.

14. The fisherman's utility rod holster according to claim 13, wherein said second sheet further includes an integrally formed tab on a top portion thereof; said tab having a snap fastener for cooperating with a snap fastening element on said base.

* * * * *